United States Patent [19]
Johnson

[11] 3,768,466
[45] Oct. 30, 1973

[54] AUTOMATIC OXYGEN BREATHING APPARATUS

[75] Inventor: Arthur H. Johnson, Davenport, Iowa

[73] Assignee: The Bendix Corporation, South Bend, Ind.

[22] Filed: Dec. 21, 1970

[21] Appl. No.: 99,816

[52] U.S. Cl. .............................. 128/142.2, 137/78
[51] Int. Cl. ............................................ A62b 7/14
[58] Field of Search ................. 128/142.2, 142 R, 128/142.4, 142.7, 145 R, 145.5, 145.8; 137/78, 81, 110, 102, 512.2

[56] References Cited
UNITED STATES PATENTS

| | | | |
|---|---|---|---|
| 2,867,227 | 1/1959 | Meidenbauer, Jr. | 128/142 X |
| 2,523,906 | 9/1950 | Holmes | 128/142.2 X |
| 2,954,793 | 10/1960 | Seeler | 137/102 X |
| 3,375,839 | 4/1968 | Crenshaw | 128/142.2 X |
| 3,509,895 | 5/1970 | Henneman | 137/81 |

FOREIGN PATENTS OR APPLICATIONS 1,139,746  11/1962  Germany .................. 128/142.2

Primary Examiner—Richard A. Gaudet
Assistant Examiner—G. F. Dunne
Attorney—Gordon H. Chenez and Plante, Hartz, Smith & Thompson

[57] ABSTRACT

Oxygen regulating apparatus of the demand and pressure breathing type for aircraft pilot use including an atmospheric air pressure responsive device operative to generate a control output signal which operates as a function of a predetermined rate of change of aircraft cabin altitude, upon a predetermined rate of ascent. The control signal causes the oxygen demand valve to open and supply 100 percent oxygen at relatively high flow rate to purge the air from the supply hose leading to the pilot's oxygen mask thereby increasing the alveolar oxygen partial pressure accordingly.

10 Claims, 3 Drawing Figures

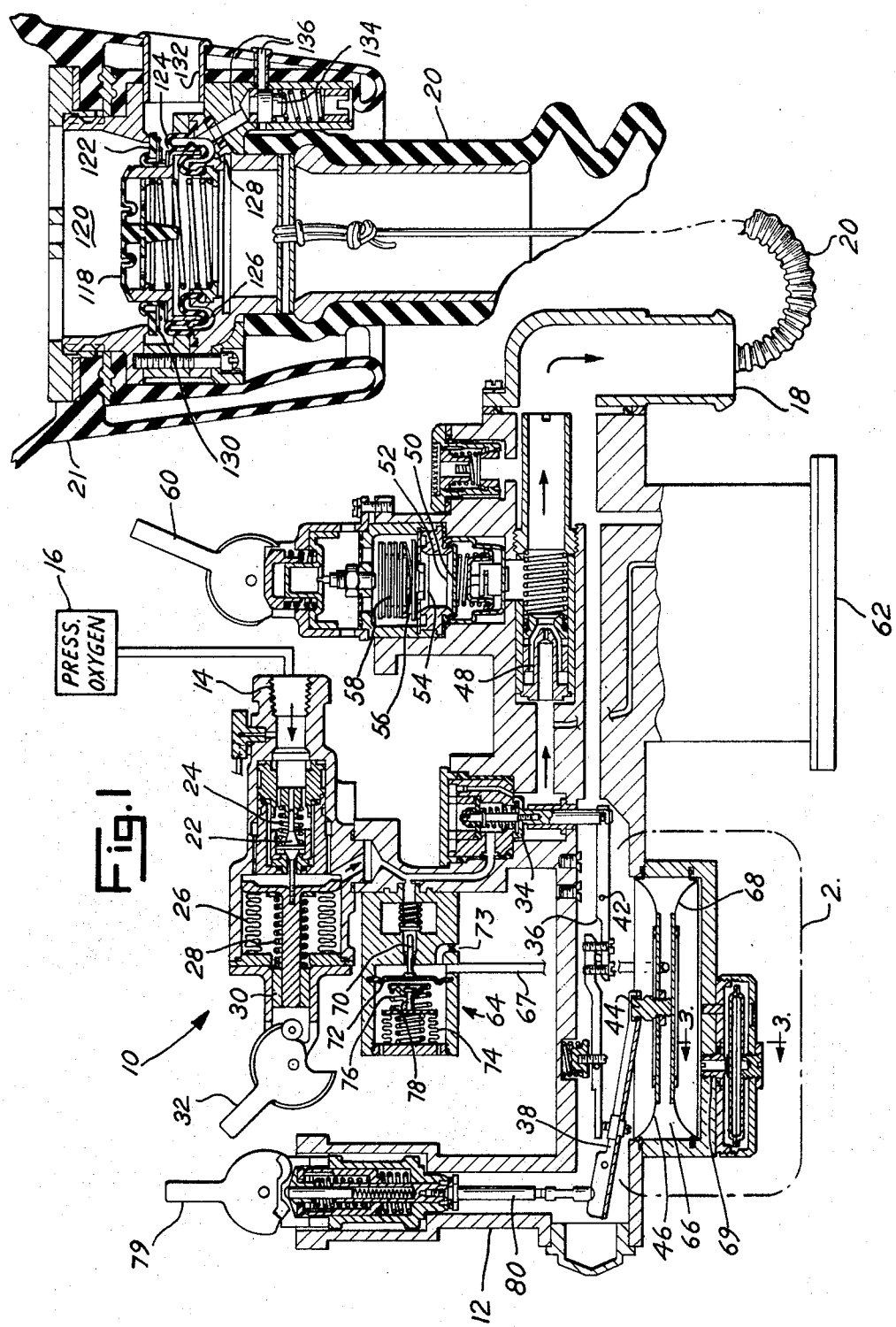

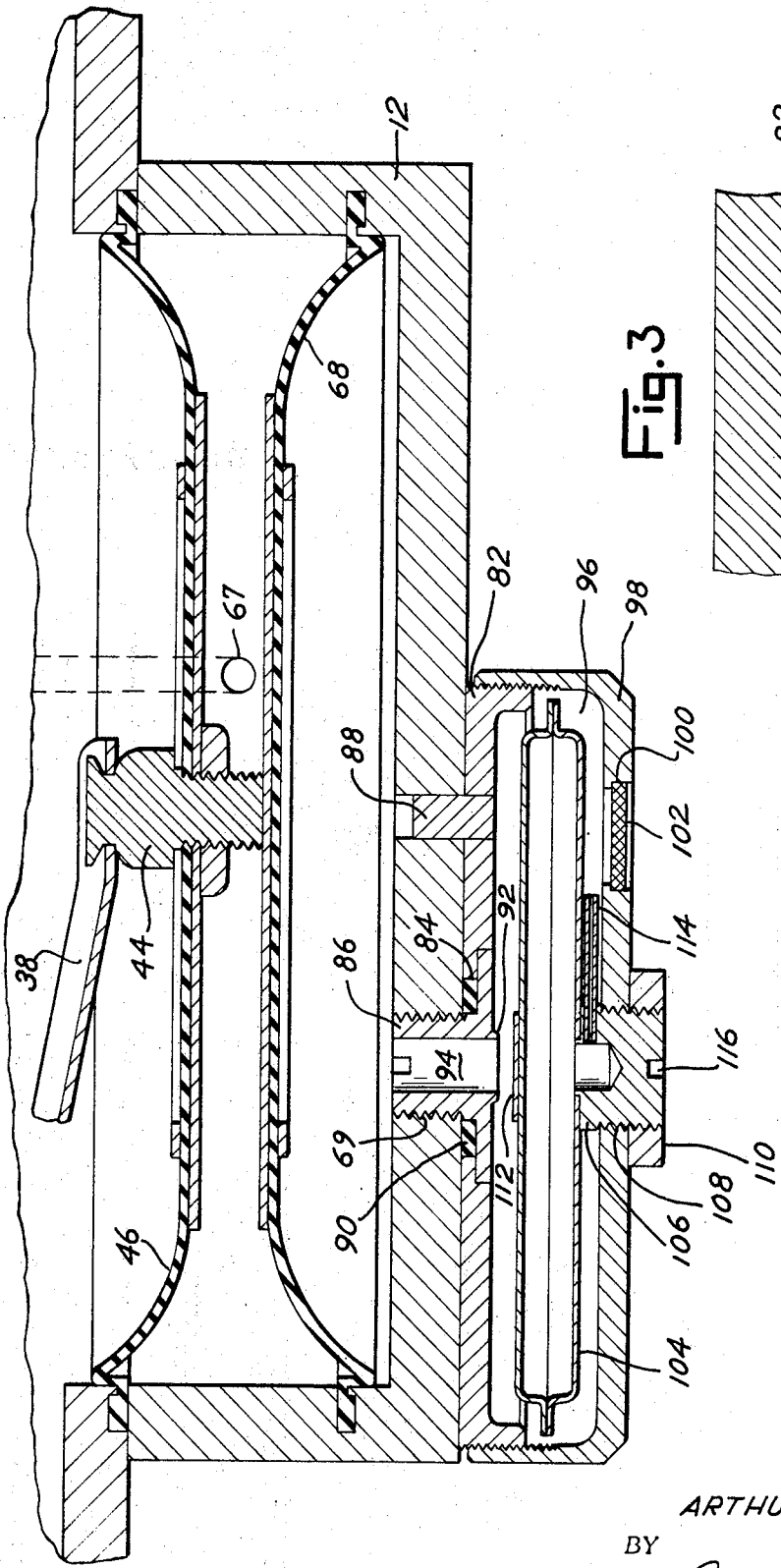
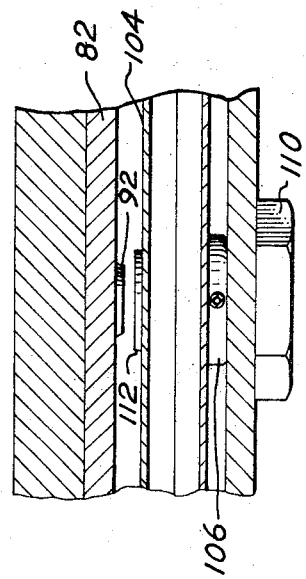
INVENTOR.
ARTHUR H. JOHNSON

AUTOMATIC OXYGEN BREATHING APPARATUS

BACKGROUND OF THE INVENTION

The present invention relates to oxygen regulators of the demand type particularly adapted for pilot survival in aircraft operative over a wide range of flight altitudes and capable of relatively rapid rate of ascent.

Oxygen breathing apparatus and its requirement for pilot survival in aircraft particularly of the high performance military type is well known. Various conventional oxygen regulators of the demand and pressure breathing type have been developed and put into use to provide the oxygen supply required by the pilot at flight altitudes where the oxygen content including partial pressure thereof of the atmospheric air is inadequate to sustain human life. Such prior art oxygen breathing apparatus includes that shown and described in U.S. Pat. No. 2,619,959 issued Dec. 2, 1952 to B. B. Holmes, U.S. Pat. No. 2,608,971 issued Sept. 2, 1952 to B. B. Holmes and U.S. Pat. No. 2,630,817 issued Mar. 10, 1953 to J. L. Pauley et al, all of which patents together with the present application share the same assignee.

The conventional oxygen breathing apparatus of the demand type operates on the basis of mixing pressurized 100 percent oxygen with aircraft cabin air to maintain an oxygen partial pressure substantially equal to that at sea level which has proved to be satisfactory at steady state altitude operation. However, it has been found through extensive tests producing reliable results that decompression caused by an increase in flight altitude produces an unsafe condition of oxygen partial pressure when based on the above-mentioned sea level conditions, particularly if the length and corresponding volume of the supply tubing between the oxygen breathing apparatus and the oxygen mask worn by the pilot exceeds a certain value. The test results indicate that the oxygen partial pressure supplied to the pilot should be increased before decompression occurs and further, that 100 percent oxygen should be supplied to the pilot quickly subsequent to the decompression to avoid subjecting the pilot to physiologically unsafe breathing conditions. An air-oxygen mixture in the connecting tubing may approach several liters depending upon the length and diameter of the tubing. This air-oxygen mixture when absorbed or "breathed down" by the pilot after a decompression in excess of a predetermined rate of change of pressure results in a dangerous reduction in alveolar oxygen partial pressure. The alveolar oxygen parital pressure may be maintained at an acceptable level by immediately supplying 100 percent oxygen to the pilot following a decompression.

It is therefore an object of the present invention to provide automatic breathing apparatus of the demand type for aircraft pilot use wherein a predetermined oxygen concentration is maintained to the pilot above a predetermined aircraft flight altitude which concentration is automatically increased to 100 percent oxygen as the cabin altitude increases in excess of a predetermined rate-of-change thereof.

It is an important object of the present invention to provide automatic breathing apparatus of the demand type for aircraft pilot use wherein the oxygen concentration supplied to the pilot is controlled to maintain alveolar oxygen partial pressure above a predetermined acceptable level in response to a rapid decrease in aircraft cabin atmospheric air pressure.

It is another object of the present invention to provide automatic breathing apparatus of the demand type including simple and reliable control means responsive to atmospheric air pressure for generating a control signal when aircraft cabin pressure decreases rapidly and wherein said control means is adapted to be easily mounted to existing automatic breathing for modifying the operation of the same.

BRIEF DESCRIPTION OF THE DRAWINGS

FIG. 1 represents a sectional view in schematic form of a demand type oxygen regulator embodying the present invention;

FIG. 2 represents an enlarged portion of the regulator shown in FIG. 1 to more clearly show the details of the major portion of the present invention;

FIG. 3 represents a view taken on line 3—3 of FIG. 2.

DESCRIPTION OF THE PREFERRED EMBODIMENT

Numeral 10 designates a conventional demand type oxygen regulator having a casing 12 provided with an inlet 14 connected to a suitable source such as tank 16 of pressurized oxygen. An outlet 18 is provided with a flexible hose 20 which supplies a controlled flow of oxygen to an oxygen mask 21 as will be described. It will be recognized that the usual location of the casing 12 in an aircraft cabin is at the aircraft instrument panel or other suitable place somewhat remote from the pilot which necessitates a relatively long hose to permit the degree of freedom of movement needed by the pilot.

Oxygen flow from inlet 14 to outlet 18 is controlled by an inlet valve 22 loaded in a closing direction by a spring 24 and in an opening direction by a bellows 26 bearing thereagainst and loaded by a spring 28 interposed between one end of bellows 26 and a spring retainer 30 slidably carried by casing 12. The spring retainer 30 is actuated by an on-off lever 32 shown in the on position which compresses spring 28 to load bellows 26 and thus valve 22 in an opening direction. The bellows 26 is exposed to the pressurized oxygen downstream from valve 22 and the resulting force derived therefrom opposes spring 28 to modify the force load on valve 22 as required to reduce the oxygen pressure level to a predetermined reduced value.

From valve 22, the oxygen flows through an oxygen demand valve assembly 34 actuated by a lever 36 one end of which is pivotally connected to valve assembly 34 and the opposite end of which bears against a lever 38. The lever 36 is mounted for pivotal movement on a fixed support 42. The end of lever 38 is secured via a pin 44 to a flexible diaphragm 46 which is exposed to the oxygen pressure at outlet 18 and responsive thereto to load lever 38 accordingly. Inhalation by the pilot causes a corresponding drop in pressure at outlet 18 which reduces the pressure on diaphragm 46 thereby generating a force which urges lever 38 in a counterclockwise direction and thus lever 36 in a clockwise direction as viewed in the drawing to actuate demand valve assembly 34 and allow oxygen flow therethrough to an injector nozzle 48 downstream therefrom. The resulting flow through injector nozzle 48 undergoes a pressure drop at the outlet of nozzle 48 and is transmitted to check valve 50 which is in flow controlling relationship with a port 52 vented to atmospheric air. A second port 54 upstream from port 52 is controlled by a air ratio valve assembly 56 which includes a bellows 58 responsive to atmospheric air and the position of a control lever 60 movable to either of two positions one of which is a normal or air dilution position and the other of which is a closed position. In the normal or air dilution position the bellows 58 is operative to reduce the quantity of atmospheric air as a function of increasing altitude drawn through port 54 when check valve 50 is open and close port 54 when a predetermined altitude which normally falls in the range of 27,000 to 30,000 ft. is reached, thereby permitting only 100 percent oxygen to the pilot above the predetermined altitude. In the closed position of lever 60, the bellows is operative to close port 54 to prevent atmospheric air flow therethrough when check valve 50 is open regardless of the flight altitude.

The atmospheric air drawn through check valve 50 mixes with the oxygen downstream from injector nozzle 48 and passes to the outlet 18 for subsequent use by the pilot.

A conventional flow indicator 62 vented to the pressurized oxygen intermediate demand valve assembly 34 and injector nozzle 48 and further vented to the pressurized oxygen downstream from injector nozzle 48 provides a visual indication of oxygen flow to the pilot.

Automatic safety pressure and pressure breathing characteristics are provided by a valve assembly 64 adapted to vent pressurized oxygen from intermediate inlet valve 22 to a chamber 66 defined by diaphragm 46 and one side of a second flexible diaphragm 68 which bears against pin 44. To that end, a passage 67 provides fluid communication between chamber 66 and valve assembly 64. The opposite side of diaphragm 68 is exposed via a port 69 to atmospheric air pressure. The valve assembly 64 includes a valve 70 attached to a diaphragm 72 exposed on one side to atmospheric air pressure and on the opposite side to pressurized oxygen admitted through valve 70 or atmospheric air pressure supplied thereto via restricted passage 73 depending upon the position of valve 70. The valve 70 is opened in response to expansion of a bellows 74 responsive to atmospheric air pressure and provided with a spring assembly 76 on the movable end thereof. At an altitude of approximately 28,000 ft., the bellows 74 has expanded to an extent whereby spring assembly 76 engages diaphragm 72 to open valve 70 and permit oxygen flow therethrough until a predetermined oxygen pressure downstream of valve 70 is attained. The predetermined oxygen pressure acts against diaphragm 68 in opposition to the opposing atmospheric air pressure thereby generating a pressure differential thereacross, which unseats diaphragm 68 from pin 44 to increase the effective volume of chamber 66. The increased volume of chamber 66 provides for a more uniform control pressure during breathing cycles. Upon reaching a flight altitude of approximately 42,000 ft. the bellows 74 has expanded causing the spring assembly 76 to compress allowing diaphragm 72 to bottom against a stop 78 forming part of spring assembly 76 thereby causing the bellows 74 to act directly against diaphragm 72. The resulting control effect of the pressure in chamber 66 provides an increasing positive air pressure at outlet 18 as flight altitude increases above 42,000 ft.

A manually operated lever 79 normally occupies the detent position shown and is positionable therefrom to actuate a spring loaded rod 80 which engages lever 38 to open valve 34 to load diaphragm 46 thereby establishing a predetermined relatively high oxygen pressure at outlet 18 whereby the pilot may check for oxygen mask leakage upon request. The demand valve assembly 34 is held open by the diaphragm 46 until the resulting pressure differential established thereacross balances the load derived from rod 80 causing demand valve assembly 34 to close thereby maintaining the predetermined relatively high pressure at outlet 18.

Referring to FIG. 2 in particular which illustrates an enlarged view of the structure of the present invention in combination with that portion of the above-described conventional oxygen regulator apparatus affected thereby. A plate 82 having an opening 84 therein is clamped against casing 12 by a fitting 86 which extends through opening 84 into threaded engagement with port 69. A pin 88 suitably secured to plate 82 and casing 12 serves to fix the position of plate 82 relative to casing 12. A resilient seal 90 interposed between casing 12 and fitting 86 provides a fluid seal. The fitting 86 is provided with a valve seat 92 at one end of a passage 94 therethrough communicating the bottom side of diaphragm 68 with a chamber 96 defined by a cap 98 threadedly secured to plate 82. A port 100 provided with a filter screen 102 in cap 98 vents chamber 96 to atmospheric air pressure.

The chamber 96 contains a flexible capsule 104 having a threaded fitting 106 fixedly secured thereto by any suitable means such as brazing for anchoring the capsule 104. The fitting 106 is threadedly engaged with a threaded opening 108 in cap 98 and is locked in position relative to cap 98 by a lock nut 110 engaged with fitting 106. The movable end of capsule 104 is provided with a valve plate 112 fixedly secured thereto which coacts with valve seat 92 to open or close the passage 94 depending upon the response of capsule 104 to the air pressure differential established thereon. The interior of capsule 104 is vented to chamber 96 via a tube 114 fixedly secured to fitting 106 by any suitable means providing an air seal which tube provides a restricted air flow path between chamber 96 and the interior of capsule 104 to thereby generate a pressure differential which varies as a predetermined function of the rate of change of atmospheric air pressure in chamber 96.

The diaphragm 68 is normally vented to atmospheric air pressure in chamber 96 via unrestricted valve seat 92 when the valve plate 112 is withdrawn therefrom in response to substantially equalized internal and external air pressures on capsule 104. However, when aircraft cabin altitude and thus atmospheric air pressure in chamber 96 decreases in excess of a predetermined rate the resulting restricted air flow through the tube 114 and thus out of capsule 104 produces a higher internal air pressure therein which, in opposition to the opposing decreasing external air pressure in chamber 96 results in expansion of capsule 104 and subsequent seating of valve plate 112 against valve seat 92 to block passage 94. The resulting differential air pressure created across diaphragm 68 which unbalances lever 38 in a counterclockwise direction causing valve assembly 34 to fully open whereupon maximum flow of 100 percent oxygen is delivered to flexible hose 20. Thus, the hose 20 is purged of any air-oxygen mixture which exists during the above-described decompression so that 100 percent oxygen is immediately available to the pilot thereby avoiding the heretofore mentioned dangerous low alveolar partial pressure and effect thereof on the pilot.

The minimum ascent rate at which the capsule 104 functions to block passage 94 to determined by the setting of fitting 106 which is adjustable and provided with a slot 116 therein whereby a screwdriver or suitable tool may be applied to rotate fitting 106 and adjust the axial position of capsule 104 as desired. The capsule 104 volume determines the time period that the above-described purging effect will continue before the capsule 104 internal pressure reduces to atmospheric air pressure causing valve plate 112 to unseat from valve seat 92.

The oxygen mask 21 is of conventional structure for the most part and includes the usual air inhalation valve generally indicated by 118 which controls the outlet flow from hose 20 to the pilot's face cavity 120 and usual air exhalation valve generally indicated by 122 which controls air flow out of the face cavity 120 to ambient pressure. Reference is made to U. S. Pat. No. 2,954,793 issued Oct. 4, 1960 to H. W. Seeler for operational details of an oxygen mask in general similar to that of mask 21 and having a so-called balanced exhalation valve. However, for the purpose of the present invention, it is deemed sufficient to understand that the exhalation valve 122 normally is held closed by a balance of opposing forces acting thereagainst which forces are derived from the pressure in face cavity 120 acting against the effective areas of inhalation valve 118 and exhalation valve 122 exposed thereto and opposing pressure in hose 20 acting against an equivalent area defined by the opposite side of inhalation valve 118 and area of a diaphragm 124 attached thereto which diaphragm is exposed to a chamber 126 vented to hose 20 via a restricted passage 128. The exhalation valve 122 is assisted to a closed position by a preload force exerted thereagainst by a relatively light compression spring 130. During a breathing cycle in the mask 21, inhalation generates a pressure differential across inhalation valve 118 which opens to charge face cavity 120 with oxygen from hose 20 and an exhalation generates a reversed pressure differential across inhalation valve 118 which closes as well as across exhalation valve 122 which results in exhalation valve 122 opening to vent face cavity 120 to ambient pressure via outlet port 132. As the exhalation pressure in face cavity 120 decreases, the force unbalance holding exhalation valve 122 open decreases accordingly establishing a force balance to again close exhalation valve 122. The cycle is repeated as breathing in mask 21 continues.

The pressure in mask 21 is limited to a predetermined maximum allowable value during purging of hose 20 with 100 percent oxygen in the above-mentioned manner by a normally closed spring loaded check valve assembly 134 suitably mounted in mask 21 in flow controlling relationship with a passage 136 leading from chamber 126 to relatively low ambient pressure. The pressure in hose 20 and thus face cavity 120 during inhalation is transmitted to chamber 126 as well as check valve assembly 134. Upon reaching the predetermined maximum allowable pressure, for instance, 17 inches of water, to which check valve assembly 134 is responsive, the check valve opens venting chamber 126 to ambient pressure. The resulting pressure drop in chamber 126 downstream from restricted passage 128 and acting against diaphragm 124 produces a force unbalance on exhalation valve 122 which moves in an opening direction to vent face cavity 120 to outlet port 132 thereby limiting the pressure in face cavity to the desired maximum allowable 17 inches of water. Obviously, when purging operation ceases and the regulator 10 assumes normal control over the flow to hose 20, the pressure in hose 20 and thus face cavity 120 permits check valve assembly 134 to remain closed whereupon the aforementioned force balance across exhalation valve 122 is effective.

I claim:

1. An oxygen regulator apparatus having means for controlling an air-oxygen breathing mixture supplied to an aircraft operator in response to a predetermined rate of ascent, said means comprising:

casing means having an inlet port and an outlet port;

a source of oxygen under pressure connected to said inlet port;

atmospheric pressure responsive means located in said casing means for controlling the flow of oxygen through said inlet port;

valve means located in said casing means for controlling the flow of oxygen through said outlet port in response to an operator demand;

ratio means connected to said outlet port and the atmosphere for establishing an air-oxygen mixture as a function of altitude;

a supply conduit connected to said ratio means for distributing said air-oxygen mixture;

mask means connected to said supply conduit through which said air-oxygen mixture is communicated in response to an operator demand;

fluid pressure responsive means operatively connected to said valve means and responsive to a pressure drop in said supply conduit generated by inhalation during said operator demand for actuating said valve means allowing oxygen to flow through said outlet port; and capsule means having an expandable chamber exposed exteriorly to atmospheric air pressure and interiorly to atmospheric air pressure through a restricted passage, said capsule means generating an output signal when the rate of change of atmospheric air pressure as sensed by a created pressure differential between the interior and exterior of the expandable chamber exceeds a predetermined value, said output signal activating said valve means for purging said supply conduit of the air-oxygen mixture by allowing oxygen to flow through the supply conduit to said mask means independently of an operator demand.

2. Oxygen regulating apparatus as claimed in claim 1 wherein:

said fluid pressure responsive means includes movable wall means responsive to a control fluid pressure differential derived from the pressure in said supply conduit and atmospheric air pressure.

3. Oxygen regulating apparatus as claimed in claim 2 wherein:

said movable wall means is vented to atmospheric air via a normally open port;

said means for generating an output signal as a function of the rate of change of atmospheric air pressure includes a valve member operatively connected to said normally open port for closing the same to prevent a decrease in atmospheric air pressure imposed on said movable wall means.

4. Oxygen regulating apparatus as claimed in claim 2 wherein:
said movable wall means includes diaphragm means exposed on one side to the oxygen pressure downstream from said normally closed valve means and on the opposite side to atmospheric air pressure.

5. Oxygen regulating apparatus as claimed in claim 1 wherein:
said expansible chamber is a capsule anchored at one end to a fixed support and at an opposite movable end operatively connected to said valve means.

6. Oxygen regulating apparatus as claimed in claim 1 and further including:
means operatively connected to said mask and responsive to the oxygen pressure in said supply conduit for limiting the air-oxygen mixture pressure in said mask means to a maximum allowable value.

7. Oxygen regulating apparatus as claimed in claim 6 wherein:
said mask means includes an inlet connected to said supply conduit and an outlet connected to relatively low ambient pressure, inhalation valve means and exhalation valve means connected to said inlet and outlet, respectively, for controlling flow therethrough and;
chamber means having a fluid connection with the pressure upstream from said inlet, and pressure responsive means connected to said exhalation valve means and responsive to the differential between pressures downstream from said inhalation valve means and in said chamber means.

8. Oxygen regulating apparatus as recited in claim 7 wherein said means for limiting the air-oxygen mixture pressure to said mask means includes:
valve member connected to said chamber through said fluid connection; and
resilient means for urging said valve member to a closed position, said resilient means responding to a predetermined pressure to vent said air-oxygen mixture under pressure in the supply conduit to ambient to limit the pressure of the air-oxygen mixture communicated through the inhalation valve.

9. Oxygen regulating apparatus as claimed in claim 8 wherein:
said normally closed valve member and said pressure responsive member connected thereto are defined by a spring loaded pressure responsive check valve.

10. Oxygen regulating apparatus as claimed in claim 8 wherein:
said fluid connection connecting said chamber means to said pressure upstream from said inlet is defined by a restricted passage.

* * * * *